UNITED STATES PATENT OFFICE.

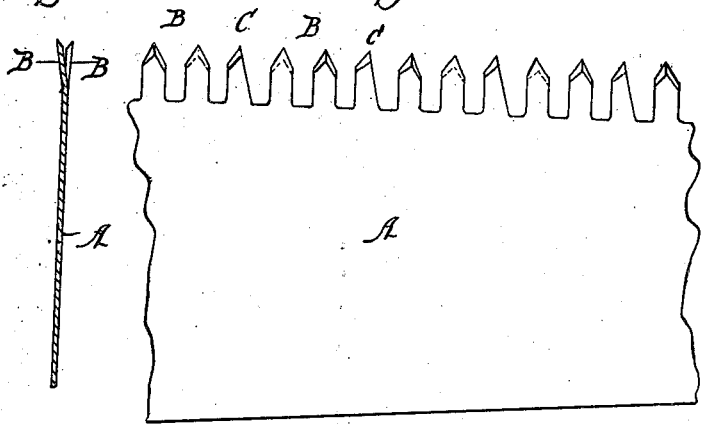
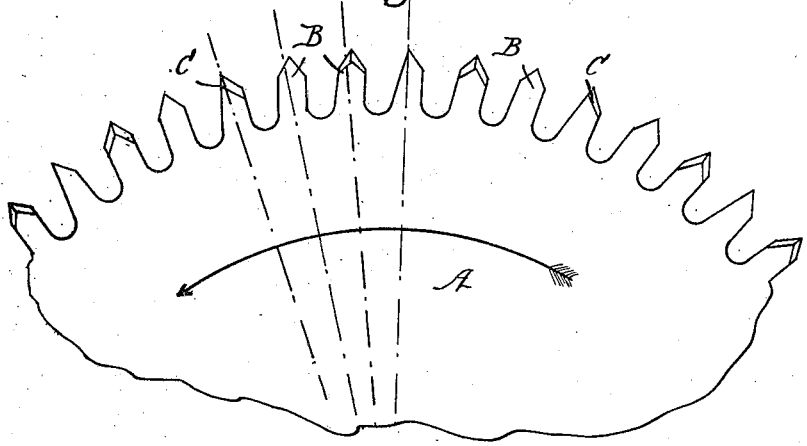

JULIUS GEORGE MATTSON, OF HERETAUNGA, NEW ZEALAND.

SAW.

1,421,520.     Specification of Letters Patent.     Patented July 4, 1922.

Application filed January 4, 1922. Serial No. 526,890.

*To all whom it may concern:*

Be it known that I, JULIUS GEORGE MATTSON, subject of the King of Great Britain, residing at Heretaunga, in the Dominion of New Zealand, have invented new and useful Improvements in Saws, of which the following is a specification.

This invention relates to saws of all kinds and it has been designed specially to provide formations of teeth and the arrangement thereof in the saw, such as to cause the saw to have a combined rip and crosscut action in its work. The invention has particular adaptation to an ordinary carpenter's hand saw and by its formation will allow for the same saw being used both for rip and cross-cut work, thereby dispensing with the present need of carrying two saws, designed respectively for such work, in the tool kit. The invention may, however, be adapted to all other classes of saws for a similar purpose, such as circular saws, or gang saws or the like.

The formation and arrangement of the teeth, forming the subject of the invention will also provide for the sawing operations being carried out with greater ease and in a clean cut manner.

The invention therefore consists in constructing the saw with two special forms of teeth designed respectively for cross-cut and rip work and in arranging such teeth so that a rip tooth is interposed between pairs of cross-cut teeth all along or around the cutting edge of the saw. These teeth are arranged with approved spaces between them.

The manner of carrying out the invention is illustrated in the accompanying drawings, in which:—

Figure 1 is a side elevation of portion of a hand saw blade showing the invention applied thereto.

Figure 2 is a cross sectional elevation thereof.

Figure 3 is a side elevation of portion of a circular saw as constructed in accordance herewith.

In all the figures, the sizes of the saw teeth with relation to that of the blade, are shewn larger than would actually be the case in practice, this being for the purpose of clearly illustrating the special features of construction embodied therein.

A is the blade, B the cross-cut teeth, and C the rip teeth. These are arranged along, or around, the cutting edge so that a rip tooth is followed by two cross-cut teeth all through, each rip tooth thus being positioned between two pairs of cross-cut teeth.

Each cross-cut tooth is made with its edges extending in parallel lines from the blade and then is sharpened to a triangular point, the two edges of the point tapering inwards from the two edges to the centre line. The side face of the point along the edges is then bevelled to one side so as to form the requisite sharp edges for cutting, and the tooth is "set" by being bent outwards from the plane of the blade in the usual way. The two teeth of each pair of cross-cut teeth have this bevel on opposite sides of the blade and are also "set" to the respectively opposite sides with the bevel inwards, as clearly shewn in Figure 2.

Each rip tooth C is shaped with its back edge parallel with the edge of the next cross-cut tooth and with its forward edge inclining slightly rearwards to its outer end. From the outer end of this front edge the tooth is tapered rearwards and inwards to the back edge so as to form a sharp point on such forward edge. The side surface of the tapered edge thus formed is bevelled to form a sharp edge all along it. This tooth is also "set" and is bevelled on the opposite side to that of the cross-cut teeth and situated before and behind it, and thus also, by reason of the relative formation of the two cross-cut teeth of each pair already described, each rip tooth is "set" and bevelled on the opposite side to the rip teeth next in order to it.

Thus throughout the full length of the saw, the whole of the teeth are bevelled and set alternately on opposite sides of the blade, in order thereby to obtain a clean cut with the requisite clearance for the blade.

When this construction and formation of teeth are adapted to a circular saw blade, each tooth is preferably given a slight rearward lean in the direction of rotation from the true radial line. This lean is such that each cross-cut tooth B has its centre line inclined backwards slightly from the radial line extending through the middle of its base to the saw centre, as indicated by the dotted radial lines in Figure 2. With each rip tooth the rearward lean is such that the radial line passes through the point of the tooth and the middle of its base, as also shewn in Figure 2.

A saw blade thus made may be filed down for sharpening and set in the ordinary way.

I claim:—

1. A saw blade having pairs of cross-cut teeth and rip teeth alternating with the pairs of cross-cut teeth, each rip tooth having a point at its forward edge and tapering inwardly from the point to its rear edge and being beveled on one side face, and on the opposite side to the succeeding rip tooth.

2. A saw blade formed with rip teeth and cross-cut teeth arranged on the cutting edge, each tooth being set opposite to the teeth positioned respectively before and behind it, and each rip tooth being beveled and set opposite to the rip teeth positioned respectively before and behind it.

In testimony whereof, I affix my signature.

JULIUS GEORGE MATTSON.